(12) United States Patent
Jarrous

(10) Patent No.: US 10,582,755 B2
(45) Date of Patent: Mar. 10, 2020

(54) MAKEUP APPLICATION DEVICE

(71) Applicant: Rachel Jarrous, Parma, OH (US)

(72) Inventor: Rachel Jarrous, Parma, OH (US)

(*) Notice: Subject to any disclaimer, the term of this patent is extended or adjusted under 35 U.S.C. 154(b) by 0 days.

(21) Appl. No.: 15/918,681

(22) Filed: Mar. 12, 2018

(65) Prior Publication Data
US 2019/0274412 A1 Sep. 12, 2019

(51) Int. Cl.
A45D 44/00 (2006.01)
G02B 7/00 (2006.01)
G02B 7/02 (2006.01)
A45D 8/36 (2006.01)

(52) U.S. Cl.
CPC ............... A45D 44/00 (2013.01); A45D 8/36 (2013.01); G02B 7/002 (2013.01); G02B 7/023 (2013.01)

(58) Field of Classification Search
CPC .. G02B 23/125; G02B 7/002; G02B 27/0176; G02B 7/022; A42B 3/042
USPC .......................................... 359/815
See application file for complete search history.

(56) References Cited

U.S. PATENT DOCUMENTS

| 1,545,281 | A | 7/1925 | Royak |
| 2,545,673 | A | 3/1951 | Pozarik |
| 2,625,855 | A | 1/1953 | Gaylor |
| 2,935,910 | A | 5/1960 | Schmidt |
| 3,085,472 | A | 4/1963 | Mack |
| 3,495,898 | A | 2/1970 | Vecchio |
| 3,840,294 | A | 10/1974 | Kneier |
| 4,108,211 | A | 8/1978 | Tanaka |
| 4,405,213 | A | 9/1983 | Kolkmann |
| 4,616,367 | A | 10/1986 | Jean, Jr. et al. |
| 4,712,254 | A | 12/1987 | Daigle |
| 4,889,303 | A | 12/1989 | Wolf |
| 4,893,919 | A | 1/1990 | Nightingale |
| 5,727,251 | A * | 3/1998 | Sherlock ................. A61F 9/027 2/11 |
| 6,010,215 | A * | 1/2000 | Miceli ..................... G02C 5/005 351/128 |
| 6,908,194 | B1 | 6/2005 | Johnson |
| 7,101,038 | B2 | 9/2006 | Miceli |
| 8,894,200 | B2 | 11/2014 | Jirsa et al. |
| 2014/0158147 | A1* | 6/2014 | Butcher ................. A45D 40/30 132/200 |

OTHER PUBLICATIONS

Medica Line: The UVC Airborne Disinfection Sterybox, Airbase Loc-Line, Retrieved from the Internet, Catalog:<URL:http://www.tissidental.com/catalog.html.
SKF Lubrication AC-4531-C Spray Block With Articulated Tube NFP, Retrieved from the Internet, Catalog:<URL: https://www.maxodeals.com/.../skf-lubrication-ac-4531-c-spray-block-with-articulated-tube-nfp.

(Continued)

Primary Examiner — Mohammad A Hasan
(74) Attorney, Agent, or Firm — Dominic A. Frisina

(57) ABSTRACT

A makeup application device comprising one or more lenses may be used for improved vision to help a person wearing the device to more easily apply makeup to the person's face. The device may include a head mount assembly for mounting the device on the person's head and one or more flexible arms for mounting the one or more lenses on the head mount assembly so that flexing of the arm or arms provides movement of the lens or lenses.

3 Claims, 5 Drawing Sheets

(56) References Cited

OTHER PUBLICATIONS

Figure 1:
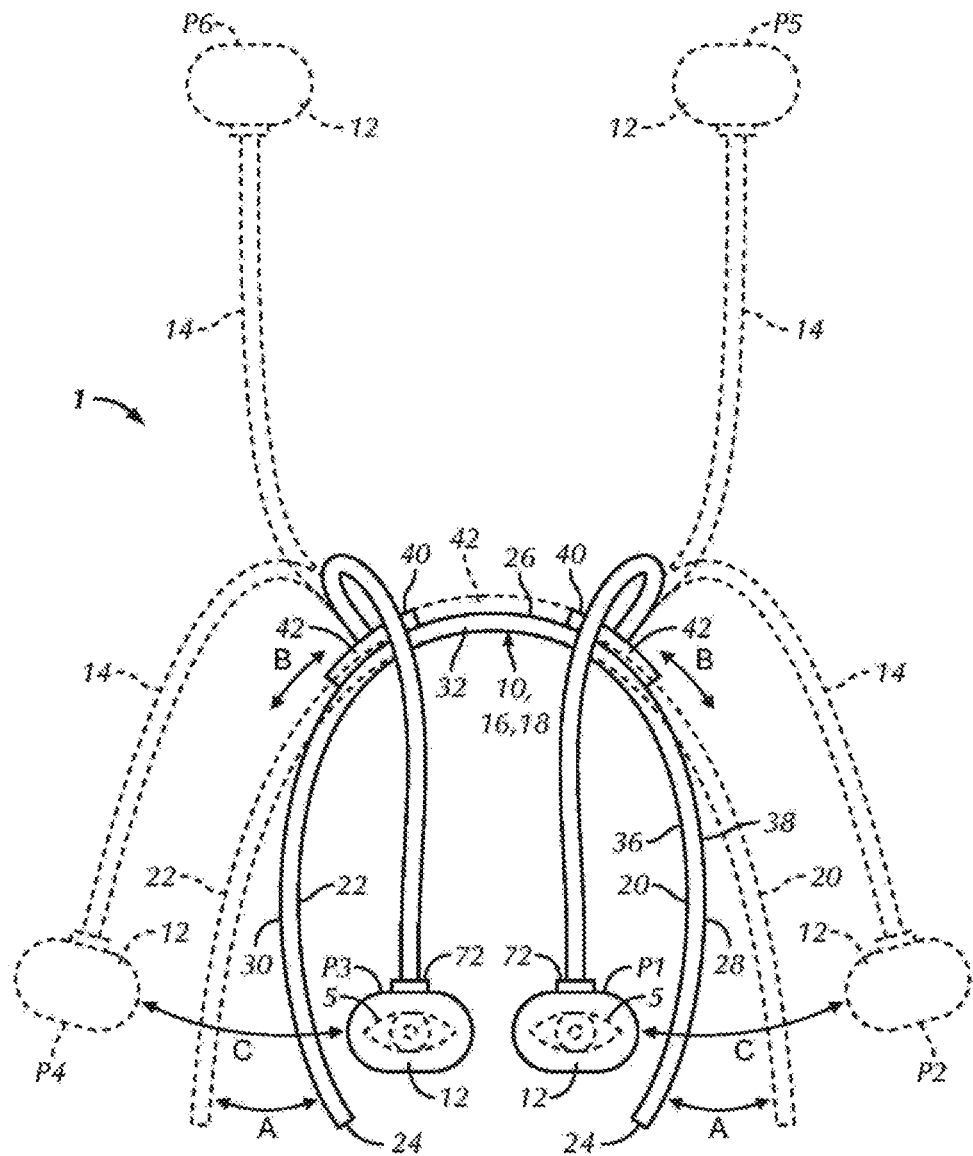

Tektronix PPM100 Flexible Articulated Arm Probe Positioner, Retrieved from the Internet, Catalog:<URL:https://www.ensentools.com/tektronix-ppm100-flexible-articulated-arm-probe-positioner/p/431-449.

Flexible Metal Tubing, Retrieved from the Internet, Catalog:<URL:http://www.flexible-gooseneck.com/index.html.

* cited by examiner

MAKEUP APPLICATION DEVICE

I. BACKGROUND OF THE INVENTION

A. Field of Invention

The present invention relates generally to a head-mounted makeup application device having a lens to help the user better see the application of the makeup to the user's face.

B. Description of the Related Art

Various makeup application devices are known in the art which provide lenses which may be positioned in front of a user's eyes to facilitate application of makeup to the user's face. Of these, some are configured somewhat like eyeglasses which may include earpieces or temples that rest on the user's ears and/or nose rests or nose pads which rest on the user's nose. For example, see U.S. Pat. Nos. 6,010,215 and 7,101,038 both granted to Miceli, U.S. Pat. No. 3,495,898 granted to Del Vecchio and U.S. Pat. No. 3,840,294 granted to Kneier. Some prior art devices provide for adjustment of the lenses to some degree, such as U.S. Pat. No. 4,405,213 granted to Kolkmann, which provides a glasses-type configuration with slidable lenses, and the above-noted U.S. Pat. No. 6,010,215, which provides an adjustable nosepiece to adjust the lenses.

Some embodiments of the present invention may provide one or more benefits or advantages over the prior art.

II. SUMMARY OF THE INVENTION

In one embodiment, a makeup application device may comprise a head mount assembly; a flexible first arm connected to and extending outwardly from the head mount assembly; and a first lens assembly which is connected to the first arm so that the lens assembly is movable in any direction relative to the head mount assembly via flexing of the first arm.

In another embodiment, a makeup application device may comprise a head mount assembly; a flexible first arm connected adjacent a first end of the arm to the head mount assembly and extending outwardly to a second end of the arm; and a first lens assembly which is connected to the first arm adjacent the second end so that the first arm and first lens assembly are supported from the head mount assembly in a cantilever fashion.

In another embodiment, a makeup application device for use by a person having a head with a face may comprise head mount means for mounting the makeup application device to the person's head; lens means through which the person can see a reflected image of the person's face; and flexible arm means extending between the head mount means and lens means for moving the lens means relative to the head mount means to a plurality of positions and selectively retaining the lens means in each of the plurality of positions.

Other benefits and advantages will become apparent to those skilled in the art to which it pertains upon reading and understanding of the following detailed specification.

III. BRIEF DESCRIPTION OF THE DRAWINGS

Figure 2:
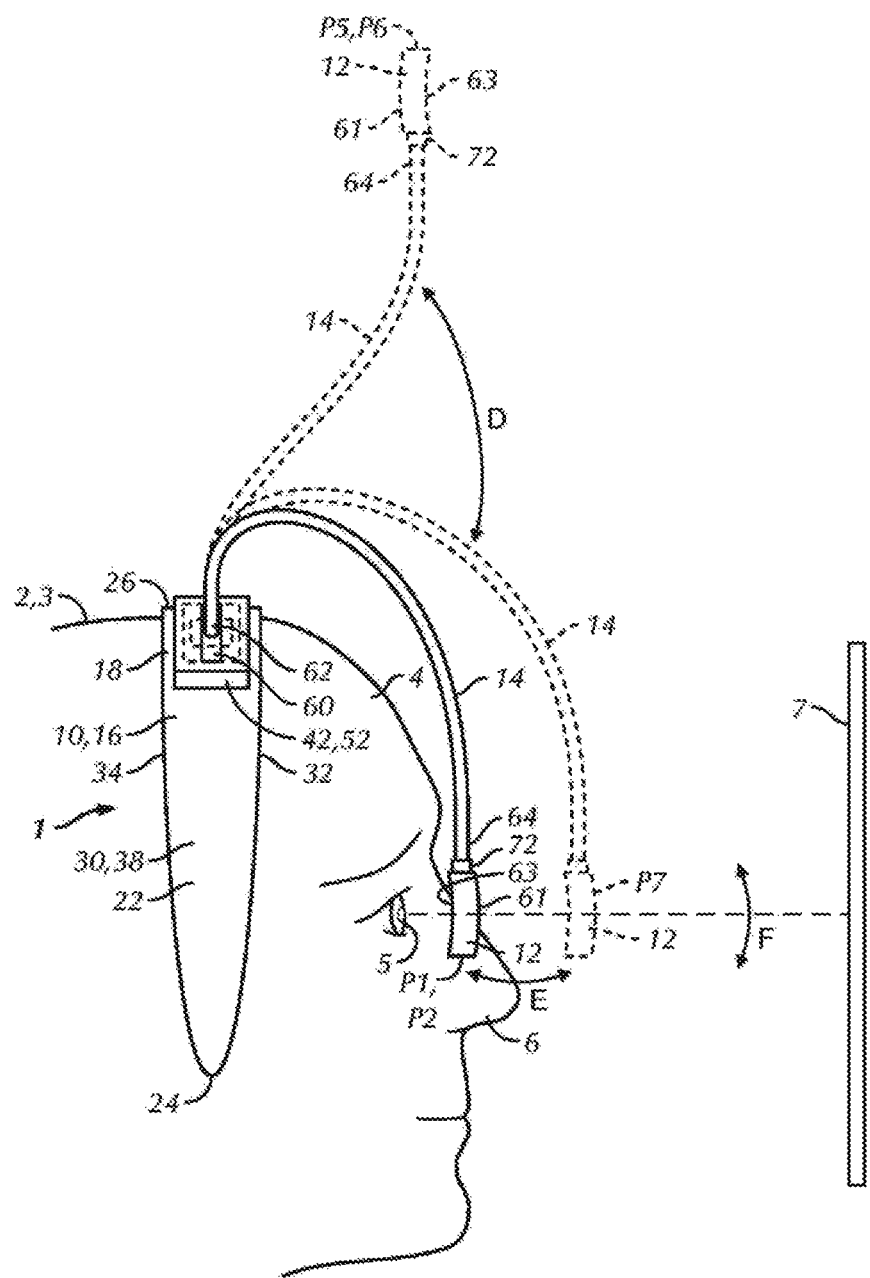
Figure 3:
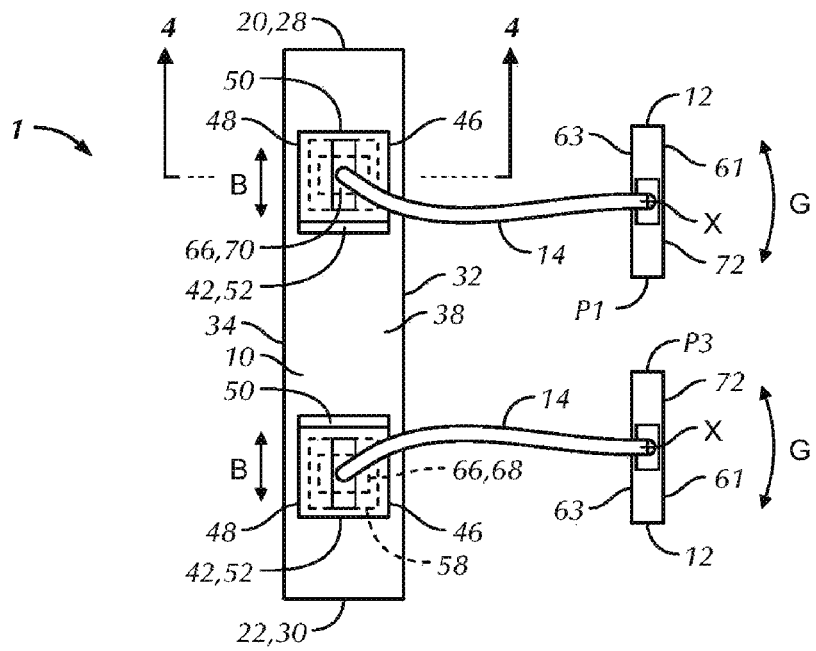
Figure 4:
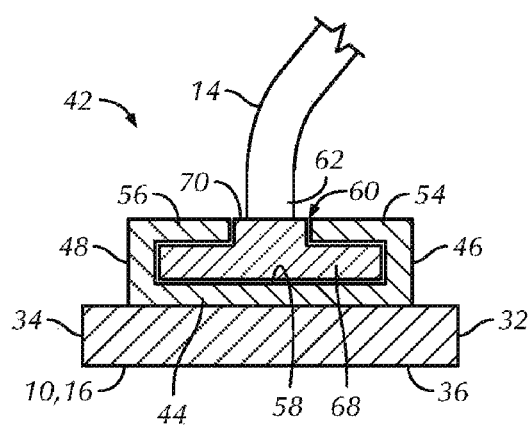
Figure 5A:
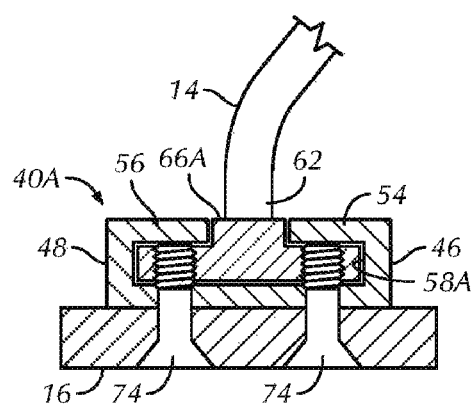
Figure 5B:
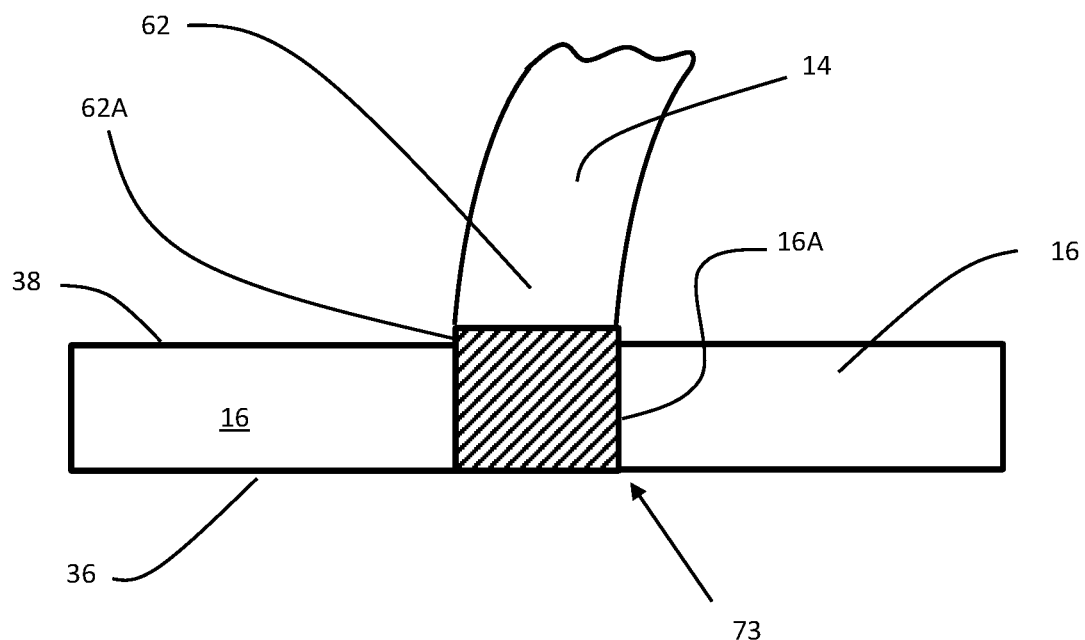

The invention may take physical form in certain parts and arrangement of parts, embodiments of which will be described in detail in this specification and illustrated in the accompanying drawings which form a part hereof, wherein like reference numerals indicate like structure, and wherein:

FIG. 1 is a front view of an embodiment.
FIG. 2 is side view of an embodiment.
FIG. 3 is a top view of an embodiment.
FIG. 4 is a sectional view taken on line 4-4 of FIG. 3.
FIG. 5A is a sectional view similar to FIG. 4.
FIG. 5B is a sectional view a simplified interference fit not including a track.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

FIGS. 1-3 show an embodiment of a makeup application device 1. As shown in FIG. 2, device 1 may be worn on a head 2 of a user or person 3 and used by the person to assist in the application of makeup to the person's face 4. FIG. 2 shows face 4 including eyes 5 (also in FIG. 1) and a nose 6. FIG. 2 further shows a mirror 7 which person 3 may use to assist in applying makeup. Device 1 includes a head mount assembly 10, one or more lenses 12, or assemblies that include lenses 12. For a given lens 12, a flexible positioning support arm 14 extends between lens 12 and head mount assembly 10. The flexible positioning support arm 14 is connected to assembly 10 and the lens 12. Head mount assembly 10 is configured for mounting makeup application device 1 on the person's head 2. The lens 12 may be configured for focusing, magnifying, or otherwise improving a reflected image such as from mirror 7. The flexible arm 14 is configured to mount the lens 12 on the head mount assembly 10 while allowing for movement of the lens as described herein. Each arm 14 may be mounted on head mount assembly 10 in a cantilever fashion.

With primary reference to FIG. 1, head mount assembly 10 may have a generally inverted U-shaped configuration and may include an inverted U-shaped headband 16 having a central or top section 18 and left and right legs 20 and 22 which are secured to and extend downwardly respectively from the left and right sides of top section 18 to respective free or terminal ends 24, which may serve as bottom ends of the legs as well as the bottom of headband 16 and assembly 10. Headband 16 has a top 26 which may be defined by top section 18, a left or leftmost side 28 defined by left leg 20, a right or rightmost side 30 defined by right leg 22, a front or front edge 32, a back or back edge 34, an inner surface 36, and an outer surface 38. As viewed from the front or back of device 10 and headband 16, each of front edge 32, back edge 34, inner surface 36 and outer surface 38 has an inverted U-shaped configuration, and inner surface 36 is concavely curved and outer surface 38 is convexly curved from adjacent the left bottom end 24 to adjacent the right bottom end 24.

Headband 16 may be formed as a single unitary piece. Headband may be formed of a plastic material, a metal, a composite material or other suitable material. Headband 16 may, for example, be formed as an injection molded plastic piece or part similar to a standard headband or hair loop. Headband 16 is flexible so that legs 20 and 22 including ends 24 thereof may move to the left and right toward and away from one another, as shown in FIG. 1 by Arrows A. FIG. 1 also shows legs 20 and 22 in a relaxed or original position in solid lines and a flexed or loaded position in dashed lines.

Headband 16 is also resilient so that when user 3 applies an outward force (leftward force on left leg 20 and rightward force on right leg 22) to spread legs 20 and 22 away from one another, the resilient nature of headband 16 will cause it to return from the flexed or loaded position to the original position when applied forces are removed from the headband 16.

The resilient nature also causes left and right legs 20 and 22 to apply an inward gripping force to the left and right sides of the head 2 of person 3. More particularly, when device 10 is worn, the rightward facing portion of inner surface 36 of left leg 20 contacts and imparts a rightward force on the left side of head 2 and the leftward facing portion of inner surface 36 of right leg 22 contacts and imparts a leftward force on the right side of head 2. The downward facing portion of inner surface 36 of top section 18 may be adjacent or in contact with the top of head 2 when device 10 is worn.

Referring primarily to FIG. 1, head mount assembly 10 may include or have secured thereto one or more arm mounts 40 for respectively securing arms 14 to assembly 10. Each arm mount 40 may be configured to fixedly secure one end of a corresponding arm 14 to assembly 10 or in a manner which allows movement of the one end of the arm 14 along assembly 10. Assembly 10 may include one or more tracks 42 which may be secured to headband 16 or which may be formed as an integral part thereof. FIG. 1 shows left and right tracks 42 in solid lines and an alternative central track 42 in dashed lines. Where makeup application device 1 has only a single lens 12, a single arm mount 40 and/or track 42 may be sufficient for mounting the single lens 12 via a single arm 14. Such a single track may be represented by any one of the left, right or central tracks, or may be represented by both the solid lines and the dashed lines in combination. Where two lenses 12 and two arms 14 are included, two mounts 40/tracks 42 may be used respectively for the two arms 14.

The person having ordinary skill in the art will readily appreciate that the tracks illustrated here are merely one option. Other tracks that are well known in the art may substitute for the illustrated track as a matter of design choice. For instance, other tracks may be recessed within the headband 16 rather than being mounted on the headband 16 as illustrated by mounts 40. Such a track may be similar in structure to the cross-sectional view of FIG. 4, but the track 42 and its bottom wall 44, front wall 46, back wall 48, and its overhanging walls 54 and 56 may instead be recessed within, and form an integral part of, the headband 16, and may extend through an arbitrarily long path along the headband 16. Moreover, the terminal end 62 of the flexible arm 14 may be integrally formed with the slide member 66 or may be in an interference fit therewith. The slide member 66 itself may be in a loose running fit with the track 42 and may be fixed in place by known means such as by fasteners. Alternatively, the slide member 66 may be in a transitional fit with the track 42 thus permitting motion along the track provided that sufficient force is applied to slide the slide member 66 along the track 42.

With primary reference to FIGS. 3 and 4, each track 42 may be secured to and extend outwardly or upwardly from outer surface 38 of headband 16. Each track 42 may include a bottom wall 44, a front wall 46, a back wall 48, a left side wall 50, a right side wall 52, a front overhanging wall 54 and a back overhanging wall 56 which together define an interior chamber or cavity 58 having a top entrance opening 60. Bottom wall 44 may be secured to and extend outwardly or upwardly from outer surface 38 of headband 16. Each track 42 and bottom wall 44 may be secured to and extend upwardly from outer or upper surface 38 of top section 18.

As used herein, the term "secured" is not limited to discrete parts that are fastened together or otherwise joined together, but rather may include integral structures such single molded parts. In this context, "secured" means the recited members are components of a unitary structure, whether joined or integral.

Referring to FIGS. 3-4, front wall 46, back wall 48, left side wall 50 and right side wall 52 are respectively secured to and extend upwardly from bottom wall 44. Front overhanging wall 54 is secured to the top of front wall 46 and extends rearward therefrom to overhang a front portion of chamber 58. Back overhanging wall 56 is secured to the top of back wall 48 and extends forward therefrom to overhang a rear or back portion of chamber 58. Walls 54 and 56 have respective rear and front terminal ends which define therebetween opening 60 and a width thereof. As viewed from the left or right side (FIG. 4), chamber 58 may have a width as defined between front and back walls 46 and 48 so that the width of opening 60 defined by the terminal ends of walls 54 and 56 is narrower than the width of chamber 58. Each track 42 may also be formed without bottom wall 44 and instead use the wall forming headband 16 as a bottom wall such that front wall 46, back wall 48, left side wall 50 and right side wall 52 may be secured to and extend upwardly from headband 16, thereby forming an analogous interior chamber and entrance opening.

While assembly 10 may be formed as described with headband 16 and a track or tracks 42, other head mount assemblies are contemplated. Another such head mount assembly may include, for example, a closed loop which may be flexible or may include flexible and rigid portions, so that the closed loop may encircle an upper or other portion of the user's head 2. Such a closed loop may be openable and closable or adjustable in length in order to fit the loop in a closed fashion on head 2. Such an alternate head mount assembly may be formed so that an arm or arms 14 and lens assembly may also be mounted in a cantilever fashion to provide movement thereof as described herein.

Lens 12 (FIGS. 1-3) is transparent and may be formed of glass or plastic or another suitable transparent material. Each lens 12 has a front surface 61 and a back surface 63. Lens 12 may be a reading lens or a prescription or corrective lens and generally functions to improve and/or magnify user's 3 vision, or magnify a reflected image of the user's face. Accordingly, the lens 12 allows the user to better see the reflected image and more accurately apply cosmetics or makeup with various cosmetic application tools. The line of sight of user 3 is represented by the dashed line in FIG. 2 which extends from eye 5 through lens 12 to mirror 7. This dashed line also represents the use noted above including the reflected image that person 3 sees of face 4 as well as makeup and makeup application tools via mirror 7.

With primary reference to FIGS. 1 and 2, each arm 14 is an elongated member having first and second opposed or terminal ends 62 and 64. Arm end 62 may be referred to as a head mount assembly end or headband end, and arm end 64 may be referred to as a lens mount end. Each elongated arm or member 14 is generally flexible or bendable to allow the user to selectively flex or bend the arm so that ends 62 and 64 thereof are movable relative to one another. This relative movement likewise applies to the movement of the lens and to the lens assembly wherein a lens 12 is joined to the lens mount 72 at end 64 of arm 14. Device 1 may be formed so that device 1 is free of any structure extending between and connecting the lens 12 assembly and head mount assembly 10 other than a flexible arm 14. Device 1 may also be formed without earpieces or temples that rest on the user's ears, such as those found in prior art makeup eyeglasses.

Each arm 14 may be of various types and may provide the type of arm movement and lens movement described further below. For example, each arm 14 may be a length or piece of metal wire or wire formed of another material or combination of materials. Each arm 14 may also be a length or piece of flexible gooseneck tubing or flexible metal arm such as those sold by Uniprise International Inc. of Terryville, Conn. or other manufacturers. Such arms may have a tubular arm wall which is corrugated or has a helical configuration. Each arm 14 may likewise be a length or piece which is segmented with multiple segments such that each given segment is rotatable in any direction relative to any other adjacent segment. That is, the one or two segments which are closest to the given segment, whereby any given segment is rotatable in any direction relative to any other segment of the arm. Such arms are sometimes referred to as articulated arms, articulated tubes, articulated metal or plastic hoses, flexible metal hoses, flexible arm retainers, 180-degree or 360-degree flexible gooseneck arms, flexible and adjustable metal or plastic arms, flexible memory arms, articulable columns or arms, flexible arms with ball and socket segments, and ball jointed support or arms. One skilled in the art will recognize that other types of arms may be used which are suited to allow movement and positioning of a given lens 12 in multiple positions while also allowing the lens 12 to be held or retained in a position chosen by user 3, as described below.

Referring to FIGS. 3 and 4, device 1 and arm mount 40 may further include a slide member 66, which may be secured to the headband end 62 of each arm 14 and slidably received within the chamber or cavity 58 of a given track 42. Each slide member 66 may include a foot or wider section 68 and a leg or narrower section 70 which is secured to and extends upwardly from foot 68. End 62 of each arm 14 may be secured to and extend outwardly or upwardly from leg 70. As viewed from the right or left (FIG. 4), foot 68 is wider than leg 70. Foot 68 is received in the wider interior chamber 58 and leg 70 is received in the narrower entrance opening 60. Front and rear overhanging walls 54 and 56 respectively overhang front and rear portions of foot 68 to retain foot 68/slide member 66 within chamber 58/track 42.

Each slide member 66 is slidable within a given chamber 58/track 42 back and forth to the left and right so that end 62 of the given arm 14 is slidable back and forth along the given track 14, headband 16 and assembly 10 to the left and to the right with slide member 66 slidably engaging track 42. This sliding movement and sliding engagement is shown and represented by Arrows B in FIGS. 1 and 3. Left and right side walls 52 and 54 of a given track 42 may serve respectively as left and right stops which the given slide member 66 may engage to respectively limit or stop leftward and rightward sliding movement of the given slide member 66.

Device 1 may further include a lens mount 72 (FIGS. 1-3) secured to lens mount end 64 of each arm 14 and to the associated lens 12. Lens mount 72 may be part of the lens means or lens assembly, whereby the movement of lens 12 described herein applies as well to said lens means or assembly. Each Arrow B also represents the movement as a unit of a given arm 14 with ends 62 and 64, slide member 66, lens 12 and lens mount 72 to the right or left so that the given arm 14 and lens 12 may if desired remain in essentially the same orientation throughout the sliding movement noted above. There may be a frictional engagement between the given slide member 66 and track 42, wherein the slide member is slidable along the track when a sufficient force is applied to the slide member to overcome the frictional engagement, and the slide member and end 62 are held fixed relative to the track via the frictional engagement when the force is removed.

Each arm 14 may be configured to be flexibly or bendably movable in any or at least multiple directions so that lens mount end 64, lens mount 72 and the lens 12 secured thereto may be movable in any direction. Each arm 14 may bend at any location in any direction from adjacent one end 62 to adjacent the other end 64 and thus essentially along its entire length. Thus, each lens 12 via flexing or bending of the arm 14 to which it is attached may with sufficient force move upward, downward, forward, backward, leftward and rightward relative to head mount assembly 10. Each arm 14 may also twist about its longitudinal axis X shown in FIG. 3 as discussed further below. Each arm 14 also has sufficient stiffness such that due to this stiffness, when arm 14 is in a resting or static state or absent a force applied to the arm 14 or the attached lens 12, the given arm's lens mount end 64 and attached lens 12 can be fixed in any position within the range of motion of end 64 and lens 12 relative to the end 62 of the given arm 14, headband 16 and assembly 10, whereby each lens assembly may be entirely supported on the head mount assembly 10/arm mount 40 by the arm to which the lens assembly is attached.

As shown by Arrow C associated with left lens 12 in FIG. 1, when user 3 applies a sufficient force to left arm 14 and/or left lens 12, end 64 of left arm 14, left lens mount 72 and left lens 12 are movable leftward along a linear, arcuate or other path via the flexing or bending of left arm 14 from a deployed position P1 (solid lines) to a non-deployed position P2 (dashed lines) to the left of position P1, and from position P2 rightward to position P1. Similarly, as shown by Arrow C associated with right lens 12 in FIG. 1, when user 3 applies a sufficient force to right arm 14 and/or right lens 12, end 64 of arm 14, right lens mount 72 and right lens 12 are movable rightward along a linear, arcuate or other path via the flexing or bending of right arm 14 from a deployed position P3 (solid lines) to a non-deployed position P4 (dashed lines) to the right of position P3, and from position P4 leftward to position P3. The movement of left lens 12 between positions P1 and P2 may occur while left lens 12 remains in a forward orientation with front and back surfaces 61 and 63 of left lens respectively facing forward and rearward. Likewise, the movement of right lens 12 between positions P3 and P4 may occur while right lens 12 remains in a forward orientation with front and back surfaces 61 and 63 of right lens respectively facing forward and rearward.

Deployed position P1 of left lens 12 may be proximal and directly in front of or forward of left eye 5, whereas non-deployed position P2 may be distal and not directly in front of left eye 5. Likewise, deployed position P3 of right lens 12 may be proximal and directly in front of or forward of right eye 5, whereas non-deployed position P4 may be distal and not directly in front of right eye 5. The movement of left lens 12 and right lens 12 noted in the previous paragraph with reference to Arrows C may be pivotal movement about a respective horizontal axis which extends forward and backward. Such pivotal movement may be, for instance, at least 20, 30, 45, 90, 180 degrees or more. A given arm 14 may be pivoted in this manner such that the attached lens 12 may be moved to and retained in a position which is inverted or upside down relative to, for instance, position P1 or P3 while the given lens 12 remains in the forward orientation.

In partially illustrating the degree of motion of the lenses that may be provided by the flexing or bending of arms 14, with reference to FIG. 1, it is noted that as viewed from the front of device 1 and head mount assembly 10, in either the wearing or non-wearing position of headband 16/head mount assembly 10, left and right lenses 12 in respective positions P1 and P3 may be entirely between left and right sides 28 and 30 of head mount assembly 10/headband 16; left lens 12 in position P1 may be entirely rightward of left side 28; left lens 12 in position P2 may be entirely leftward of left side 28; right lens 12 in position P3 may be entirely leftward of right side 30; and right lens 12 in position P4 may be entirely rightward of right side 30.

It is similarly noted that as viewed from the front of device 1 and head mount assembly 10, when device 1 is worn on the user's head 2, left and right lenses 12 in respective positions P1 and P3 may be entirely between the left and right sides of head 2; left lens 12 in position P1 may be entirely rightward of the left side of head 2; left lens 12 in position P2 may be entirely leftward of the left side of head 2; right lens 12 in position P3 may be entirely leftward of the right side of head 2; and right lens 12 in position P4 may be entirely rightward of the right side of head 2. The left side of head 2 may be represented by a portion of inner surface 36 of left leg 20 shown in dashed lines in FIG. 1, whereas the right side of head 2 may be represented by a portion of inner surface 36 of right leg 22 shown in dashed lines in FIG. 1.

FIG. 2 shows additional movement of both lenses 12 and arms 14 at Arrow D. When user 3 applies a sufficient force to left arm 14 and/or left lens 12, end 64 of left arm 14, left lens mount 72 and left lens 12 are movable along an arcuate or pivoting path via the flexing or bending of left arm 14 upward from deployed position P1 to a non-deployed position P5 (dashed lines in FIGS. 1-2) upward of and distal position P1, and downward from position P5 to position P1. Similarly, when user 3 applies a sufficient force to right arm 14 and/or right lens 12, end 64 of right arm 14, right lens mount 72 and right lens 12 are movable along an arcuate or pivoting path via the flexing or bending of right arm 14 upward from deployed position P2 to a non-deployed position P6 (dashed lines in FIGS. 1-2) upward of and distal position P2, and downward from position P5 to position P2. The left lens 12 in non-deployed position P5 may be distal and not directly in front of left eye 5, and the right lens 12 in non-deployed position P6 may be distal and not directly in front of right eye 5.

The movement of left lens 12 between positions P1 and P5 may cause left lens 12 to flip, turn upside down or pivot 180 degrees to move between the forward orientation of position P1 with front and back surfaces 61 and 63 of left lens respectively facing forward and rearward, and a rearward orientation of position P5 with front and back surfaces 61 and 63 of left lens respectively facing rearward and forward. Thus, the top and bottom of left lens 12 of position P1 become the bottom and top of left lens 12 respectively in position P5. Likewise, the movement of right lens 12 between positions P2 and P6 may cause right lens 12 to flip, turn upside down or pivot 180 degrees to move between the forward orientation of position P2 with front and back surfaces 61 and 63 of right lens respectively facing forward and rearward, and a rearward orientation of position P6 with front and back surfaces 61 and 63 of right lens respectively facing rearward and forward. Thus, the top and bottom of right lens 12 of position P2 become the bottom and top of right lens 12 respectively in position P6. The movement of left lens 12 and right lens 12 noted in this paragraph and the previous paragraph may be pivotal movement about a respective horizontal axis which extends from left to right. Such pivotal movement may vary as desired by the user and may be, for instance, at least 20, 30, 45, 90, 180 degrees or more although finer adjustments may likewise be achieved such as within a range of 1 to 5 or 10 degrees.

In further illustrating the degree of motion of the lenses that may be provided by the flexing or bending of arms 14, with reference to FIGS. 1-2, it is noted that left and right lenses 12 in respective positions P1 and P3 may be entirely lower than the top 26 of headband 16 and head mount assembly 10; and left and right lenses 12 in respective positions P5 and P6 may be entirely higher than the top 26 of headband 16 and head mount assembly 10.

FIG. 2 further shows at Arrow E movement of lenses 12 in a manner similar to that described with reference to Arrow D although to a lesser degree, such as within a range of 1 to 5 or 10 degrees. That is, each lens 12 may move in a similar manner except Arrow E shows movement from position P1 or P2 forward to a position P7 in dashed lines (representing both lenses 12) and from P7 rearward to position P1 or P2 while the respective lens 12 remains in the forward orientation as well as proximal and/or directly in front of the given eye 5. The movement shown by Arrow E may represent a finer adjustment by person 3 so that the given lens is appropriately positioned to provide the desired improvement of the user's vision or magnification of the reflected image of the person's face, cosmetics and cosmetic application tools for the application of makeup to the person's face. Lenses 12 may also be moved leftward and rightward (Arrows C) to provide such a finer adjustment while the respective lens 12 remains in the forward orientation as well as proximal and/or directly in front of the given eye 5.

Moreover, each lens 12 may be tilted or pivoted (Arrow F in FIG. 2) about a horizontal axis to provide a finer adjustment via, for example, the flexing or bending of a lower portion of the corresponding arm 14 while the given lens 12 remains essentially in the same position (for instance in position P1 or P7) in a forward orientation adjacent and forward of the given eye 5. FIG. 3 at Arrows G further illustrates that each lens 12 may be pivoted about the longitudinal axis of the arm 14 on which it is mounted or about a vertical axis by twisting the given arm 14 about its longitudinal axis or a vertical axis X. More particularly, this twisting movement may involve twisting one portion of the given arm 14 relative to another portion of that arm. This twisting or pivotal movement may be used as a finer adjustment of the given lens while proximal and/or directly in front of the given eye 5 while the lens remains in the forward orientation, for instance, in the range of 1 to 5 or 10 degrees. However, this twisting or pivoting movement may be substantially greater as well, for instance, at least 20, 30, 45, 90, 180 degrees or more.

Where two arms 14 and lenses 12 are used as shown in FIGS. 1 and 3, each lens 12 and lens end 64 of one of flexible arms 14 is movable independently of the other lens 12 and lens end 64 of the other flexible arm 14. For instance, the left lens 12 and lens end 64 of the left arm 14 are movable relative to the right lens 12 and lens end 64 of the right arm 14 as the left arm 14 is bent or flexed, either while the right lens 12, lens end 64 of the right arm 14 and right arm 14 are fixed relative to headband 16/assembly 10 and headband end 62 of right arm 14, or while right lens 12, lens end 64 of right arm 14 and right arm 14 are moving relative to headband 16/assembly 10 and headband end 62 of right arm 14. Likewise, right lens 12 and lens end 64 of right arm 14 are movable relative to left lens 12 and lens end 64 of left arm 14 as right arm 14 is bent or flexed, either while left lens 12, lens end 64 of left arm 14 and left arm 14 are fixed relative to headband 16/assembly 10 and headband end 62 of left arm 14, or while left lens 12, lens end 64 of left arm 14 and left arm 14 are moving relative to headband 16/assembly 10 and headband end 62 of left arm 14.

When person 3 wears device 10 on his or her head 2 and adjusts the position of the one or more lenses 12 in front of one or both eyes 5 in the deployed position such as shown in solid lines in FIGS. 1-2, it may be that no portion of device 10 contacts the person's or user's nose 6 and that no portion of arm 14 or the lens assembly including lens 12 and lens mount 72 contacts the person's face 4. It may be that when device 10 is worn, only headband 16/head mount assembly 10 of device 1 is in contact with the person's head 2.

One skilled in the art will understand that a given end 64 and lens assembly mounted thereon may thus move along virtually any path, including the ability to pivot about any axis from 1 to 180 degrees or more. This freedom of movement allows the user of device 1 to easily position the one or more lenses in front of the user's eye or eyes or distal the eye or eyes as desired. Such movement also allows for fine adjustments such as may be desired when a given lens is in its deployed position in front of the user's eye.

Moreover, lens 12 and lens mount 72 structures in accord with embodiments of the invention may provide for removable and/or interchangeable lenses using structures well-known in the art as a matter of design choice. For example, a user having impaired vision may require a lens having a first power for applying eye makeup, which may require the user to position her face very close to a mirror. However, the user may require a lens having a second very different power to view her overall appearance from a greater distance. Therefore, it may be desirable to permit the user to quickly interchange lenses by means of a quick-connect fastener, or other similarly convenient fastener, as are well-known in the art. Additionally, lenses within the scope of the invention may be prescription bifocal or trifocal lenses. While such a lens may enable the user to switch quickly between close-up and distant views without having to change lenses, having the ability to change out such a lens provides the user with a device that can adapt as the user's prescription changes. Accordingly, the foregoing quick-connect fastener may be desirable even when an embodiment comprises a bifocal or trifocal lens.

As noted further above, device 1 may be formed so that slide member 66 is fixed relative to headband 16, whereby member 66 may be a non-sliding mounting member such that end 62 of arm 14 may be fixed relative to headband 16. Device 1 may also be formed with different arm mounts which fixedly secure end 62 of arm 14 relative to headband 16. This is illustrated in FIG. 5A by arm mount 40A. Mount 40A may be formed with an interference fit which secures and prevents movement of end 62 of arm 14 relative to headband 16. FIG. 5A is similar to FIG. 4 and illustrates that a mounting member 66A may be formed similar to slide member 66 to be held within a cavity or chamber 58A similar to chamber 58 of FIG. 4, except that member 66A is fixed within cavity 58A by a suitable means.

This may include mounting member 66A being held by an interference fit as one skilled in the art will understand. Thus, for instance, mounting member 66A may be sized to fit snugly within cavity 58A without sliding or otherwise moving within cavity 58A. Alternatively or additionally, mounting member 66A may be fixedly secured to headband 16 by one or more fasteners 74 which may be screws, bolts or other suitable fasteners known in the art. FIG. 5A shows, for instance, that fasteners 74 may extend through respective holes in headband 16 and a portion of mount 40A and be threaded into threaded holes in mounting member 66A to fixedly secure member 66A and end 62 of arm 14 to headband 16. Such a fixed mounting of end 62 of arm 14 allows for the same type of flexing movement of the given arm 14 and movement of the lens 12 via said flexing described herein.

FIG. 5B illustrates another type of interference fit according to embodiments of the invention. Particularly, the end 62 of flexible arm 14 is shown terminating in a section 62A which is in an interference fit 73 with headband 16. As illustrated, the section 62A may extend through an aperture 16A of the headband 16 from the outer surface 38 to the inner surface 36. The skilled artisan will readily understand that the aperture 16A may not extend all the way through the thickness of the headband 16, provided that sufficient contact is made between the section 62A and the aperture 16A to permanently fix the flexible arm 14 in the headband 16. The skilled artisan will further appreciate and understand that a flange (not shown) may be added to the end of section 62A flush with the inner surface 36 of the headband 16 to better retain the flexible arm 14. With continuing reference to section 62A, this section may differ in material choice from that of the rest of flexible arm 14. More specifically, a stiffer and/or tougher material may be more suitable for making an interference fit with the headband 16 that the relatively pliable material of the flexible arm 14.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A makeup application device comprising:
   a head mount assembly;
   a flexible first arm connected to and extending outwardly from the head mount assembly; and
   a first lens assembly which is connected to the first arm so that the lens assembly is movable in any direction relative to the head mount assembly via flexing of the first arm, wherein the lens assembly is movable relative to the head mount assembly via flexing of the first arm between a deployed position and a non-deployed position distal the deployed position, wherein the lens assembly in the deployed position is directly in front of an eye of a person when the person is wearing the makeup application device, and the lens assembly in the non-deployed position is not directly in front of the eye when the person is wearing the makeup application device.

2. A makeup application device comprising:
   a head mount assembly;
   a flexible first arm connected to and extending outwardly from the head mount assembly; and
a first lens assembly which is connected to the first arm so that the lens assembly is movable in any direction relative to the head mount assembly via flexing of the first arm, wherein the lens assembly is movable relative to the head mount assembly via flexing of the first arm between a first position in which the lens assembly has a forward orientation and a second position in which the lens assembly has a rearward orientation.

3. The device of claim 2 wherein the lens assembly in the rearward orientation is upside down relative to the lens assembly in the forward orientation.

* * * * *